May 10, 1949.	G. F. HOGE	2,469,921
VALVE
Filed March 7, 1945
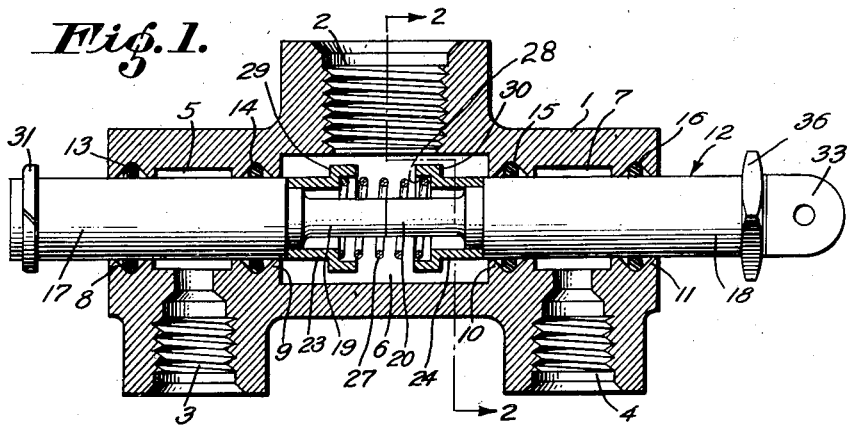
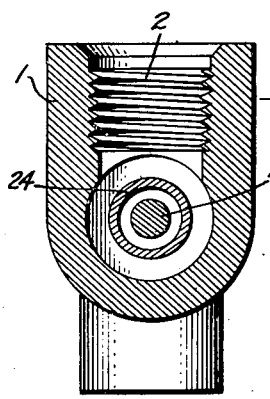
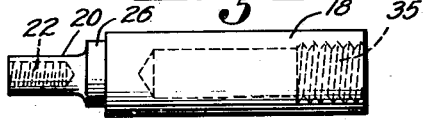
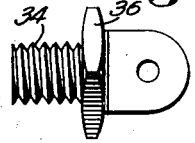
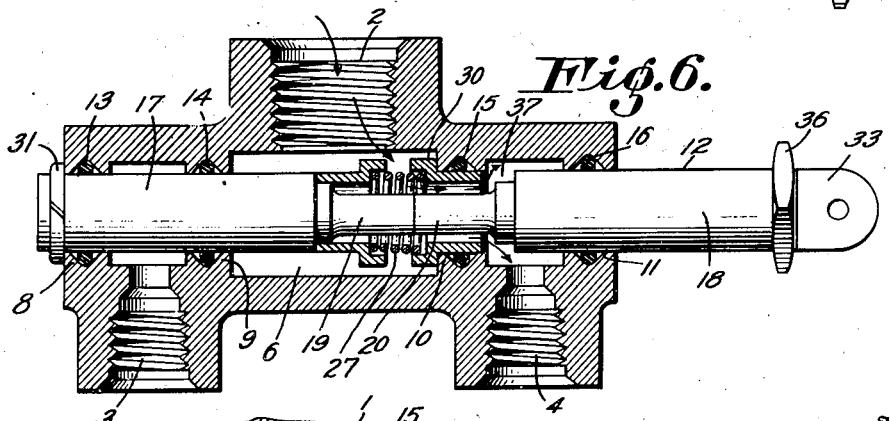
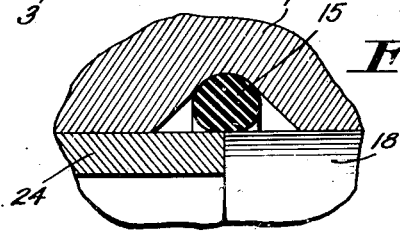
Inventor
George F. Hoge
By Donald W. Farrington
Attorney Patented May 10, 1949

2,469,921

UNITED STATES PATENT OFFICE 2,469,921

VALVE

George F. Hoge, Baltimore, Md., assignor to The Glenn L. Martin Company, Middle River, Md., a corporation of Maryland Application March 7, 1945, Serial No. 581,411

1 Claim. (Cl. 251—76)

This invention relates to a novel sealing structure in a valve that will afford a fluid-tight seal to prevent internal leakage and seepage between chambers and passages within the valve.

There are many valves in hydraulic systems and installations that provide multiple flow paths for different settings of the valve and because the different flow paths are interconnected at the valve, there must be no leakage or seepage of hydraulic fluid within the valve. This is particularly important in the high pressure hydraulic systems currently being used on aircraft where the pressure of the hydraulic systems range from 1500 to 3000 pounds per square inch. In a system under such high pressures, the internal sealing of the valve presents quite a problem with ordinary valve construction, because some means must be provided to insure against leakage so that hydraulically operated parts will not be caused to move inadvertently. For example, in an airplane having hydraulically operated flaps, the hydraulic controls position the flaps in a high lift position for take-off and further movement of the flaps puts them in a high drag position for landing. It can readily be seen that any leakage in the valve might cause the hydraulic system to move from the high lift to the high drag position inadvertently.

Attempts have been made in such systems to seal the valve against internal leakage by the use of ball valves or poppet valves but the difficulty of getting absolute seating of such valves coupled with the fact that a poppet or similar valve must be opened against the 1500 to 3000 pounds per square inch, pressure in the system renders them undesirable because of the mechanisms and expedients that must be resorted to crack the valves for pressure balance before opening.

It is well known that the O-ring elastic gasket in a V-groove affords an excellent seal against leakage in the high pressure systems now in use.

The O-ring is placed in a groove in the wall of a bore surrounding a cylindrical valve or shaft. The O-ring fits snugly around the valve or shaft as it rests in the groove and for this reason, the end of the cylindrical member or shoulder on such a member cannot be moved past the seal. The seal must be protected against the abrasion of edges of the structure and grit in the hydraulic fluid.

An object of this invention is the prevention of internal leakage or seepage in high pressure multi-flow valve.

Another object of this invention is to provide structure that will permit the use of O-ring seals in valve structures where it is necessary to withdraw the cylindrical member from the seal.

Another object of the invention is the provision of a follower structure, apertured to permit the flow of fluid therethrough that moves into place over the seals in the valve as the valve is opened to protect the seals from fluid flow and also to maintain the seals in place so that they will permit the reentry of the valve upon closing.

Another object of the invention is the provision of follower structure that will support and protect the valve sealing member from abrasion.

Further and other objects will become apparent from the description of the accompanying drawings which form a part of this disclosure and in which like numerals refer to like parts.

In the drawings:

Figure 1 is a sectional view through the valve.

Figure 2 is a section taken on the line 2—2 of Figure 1.

Figure 3 is an elevation of the left hand portion of the valve.

Figure 4 is an elevation of the right hand portion of the valve.

Figure 5 is the valve terminal member.

Figure 6 is a sectional view similar to Figure 1 showing the valve in the open position.

Figure 7 is a fragmentary sectional view enlarged to show the relationship of the valve, valve follower and seal.

Figure 1 is a sectional view through a selector valve showing the parts in their operative relationship. Valve housing 1 is formed with ports 2, 3 and 4. Chambers 5, 6 and 7 are formed within the housing and are in communication with ports 3, 2 and 4 respectively. Partitions 8, 9, 10 and 11 of the housing form the end walls of chambers 5, 6 and 7. Valve assembly 12 extends through openings in partitions 8 to 11. Seals 13, 14, 15 and 16 afford a fluid-tight, sliding fit between valve assembly 12 and the walls of the openings in partitions 8 to 11.

Seals 13 to 16 are of a type that has come into general use in hydraulic equipment. The seals, usually designated as O-rings are annular sealing gaskets that are generally circular in cross-section and are made of soft rubber or of rubber-like synthetic plastics. Neoprene or some other synthetic elastomer may be used that will resist the deteriorating action of hydraulic fluid if oil is used as the fluid. Such a structure forms an effective seal between a cylindrical member such as valve assembly 12 and the walls of the openings through which member 12 extends for extremely high pressures. For the best results, these seals are placed in grooves having rounded bottoms and side walls forming an angle of approximately 90° to one another. Rectangular grooves may also be used for the seals. The inside diameter of this annular seal which is generally circular in cross-section is such that it engages the valve assembly 12 with a snug but sliding fit.

Valve assembly 12 consists of left hand portion 17 and right hand portion 18 which have portions 19 and 20 screw-threaded together at 21 and 22. Members 17 and 18 are shown drilled out to save weight. Sleeve valve followers 23 and 24 are mounted on the left and right hand valve portions and extend over supporting portions 25 and 26. Spring 27 fits in grooves 28 and normally maintains sleeves 23 and 24 in spaced relationship in place on supporting projecting portions 25 and 26. It will be noted that the external diameters of sleeves 23 and 24 when so mounted are substantially the same diameter as the diameters of members 17 and 18 and by holding the tolerances of these parts within a few thousandths of an inch, it is possible to have members 23 and 24 abut portions 17 and 18 so that their external walls form one substantially continuous smooth surface. Shoulders 29 and 30 on these sleeve valve followers act as stops to limit their path of travel as valve assembly 12 is moved. Snap ring 31 is placed in groove 32 of member 17 to limit the motion of the valve in one direction. Terminal 33 has portion 34 that threads into member 18 at 35. Hex member 36 acts as a stop to limit the motion of valve assembly 12.

In the assembly of the valve, seals 13 to 16 are placed in the grooves in the housing 1. The left hand portion of the valve 17 is inserted past seals 13 and 14. Sleeves 23 and 24 and spring 27 are inserted through port 2 in position within chamber 6. Member 18 is inserted through seals 15 and 16 and portion 21 on member 17 is threaded into portion 22 on member 18 to secure these elements in assembled relationship to form valve assembly 12. As shown in Figure 1 snap ring 31 and member 36 limit the axial travel of the valve.

In operation, such a valve will afford two flow paths through the housing. If port 2 is selected as an inlet, as shown in Figure 6, when assembly 12 moves to the right seals 13 and 14 are unaffected but continue to maintain an effective fluid seal between member 17 and partitions 8 and 9. Seal 16 is unaffected and engages member 18 to form a fluid-tight seal. Sleeve member 24 moves to the right until shoulder 30 contacts partition 10 which limits its movement. It will be noted that as sleeve 24 moves to the right in abutting relation with member 18 as shown in Figure 7, the sleeve follows the valve and moves past seal 15. Further movement of valve 18 to the right, leaves sleeve 24 in partition 10 when shoulder 30 seats on the partition and opens a port 37 between the abutting ends of sleeve 24 and member 18, fluid will then flow through port 2 into chamber 6 between the coils of spring 27 through the annular space between member 20 and sleeves 24 through port 37 and out port 4. When the valve is moved to the left, it will return to the neutral position shown in Figure 1 and if moved further to the left will cause fluid to flow from port 2 to port 3 in the manner described above.

It will be noted that the seals in this valve are fully protected from the flowing fluid under all conditions. They are subjected to only the static pressure of the fluid when they effect a fluid-tight seal. By maintaining the close tolerances specified, the discontinuity between the abutting ends is not such that it will damage the seal as it passes thereover. Rather than any force tending to extrude the seal into any groove between the abutting ends of these parts, it will be noted that fluid pressure would tend to work outwardly between the abutting ends and prevent this seal from extruding.

The principal features of the invention have been described and illustrated in a novel selector valve but the sealing structure can readily be adapted to any form of flow control valve with advantages set forth above.

A valve embodying the sealing structure of this invention can be used for flow in either direction with equally effective fluid sealing, whereas ball or poppet valves afford effective sealing in one direction only. Ball or poppet valves always require large forces or torques to open the valves against the fluid pressure while the valve of this invention is a balanced valve and the force to open it is only that force necessary to overcome the sliding fit of the O-ring seals on the valve member.

It is to be understood that certain changes, alterations, modifications and substitutions can be made without departing from the spirit and scope of the appended claim.

I claim as my invention:

A valve including a valve body having three aligned chambers, a central chamber and two outer chambers, fluid passages extending through the walls of said valve body, one communicating with each chamber, transverse partitions in said valve body forming the end walls of each chamber, said end walls provided with aligned circular bores, a valve having cylindrical end portions mounted for axial movement in said bores, said cylindrical end portions proportioned to extend through the end walls of the outer chambers and to form a sliding fit with said bores, the edges of said bores each having a V-groove opening toward said valve member, a resilient elastic O-ring seal positioned in each of said grooves surrounding said valve member with a snug fit, the portion of said valve between said cylindrical end portions extending through said central chamber being of decreased diameter, a pair of sleeve followers mounted for limited movement on said central portion, said followers having outer diameters corresponding to the diameter of said cylindrical end portions forming extensions thereof, the inner diameter of said sleeve being greater than the diameter of said central portion of said valve to form a passage therethrough, spring means urging said followers into abutting relationship with said end portions during a portion of the axial travel of said valve, stop means on each of said followers to limit the axial travel after said follower has passed under said O-ring seal, affording a flow path for fluid through said sleeve when said valve is in one extreme axial position, and affording a two-directional fluid-tight seal between adjacent chambers.

GEORGE F. HOGE.

REFERENCES CITED

The following references are of record in the file of this patent:

UNITED STATES PATENTS

| Number | Name | Date |
|---|---|---|
| 382,469 | Hawthorn | May 8, 1888 |
| 432,744 | Adams | July 22, 1890 |
| 969,803 | Pollock | Sept 13, 1910 |
| 1,281,712 | Thompson | Oct. 15, 1918 |
| 1,293,858 | Mills | Feb. 11, 1919 |
| 1,385,019 | Mathieu | July 19, 1921 |
| 2,217,835 | Corbin, Jr. | Oct. 15, 1940 |
| 2,360,733 | Smith | Oct. 17, 1944 |